(12) United States Patent
Kai et al.

(10) Patent No.: US 6,981,782 B2
(45) Date of Patent: Jan. 3, 2006

(54) LAMP WITH REFLECTING MIRROR AND IMAGE PROJECTING APPARATUS

(75) Inventors: Makoto Kai, Osaka (JP); Makoto Horiuchi, Nara (JP); Kiyoshi Takahashi, Kyoto (JP); Shinichiro Hataoka, Osaka (JP); Tomoyuki Seki, Osaka (JP); Tsuyoshi Ichibakase, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 216 days.

(21) Appl. No.: 10/682,452

(22) Filed: Oct. 9, 2003

(65) Prior Publication Data

US 2004/0085768 A1 May 6, 2004

(30) Foreign Application Priority Data

Oct. 18, 2002 (JP) .............................. 2002-304217

(51) Int. Cl.
*F21K 7/00* (2006.01)
(52) U.S. Cl. ...................... 362/264; 362/294; 362/310; 362/345; 362/373; 362/547

(58) Field of Classification Search ................ 362/218, 362/263–264, 267, 294, 296, 310, 341, 345, 362/373, 547
See application file for complete search history.

(56) References Cited

U.S. PATENT DOCUMENTS 6,575,599 B1   6/2003   Imamura et al.

FOREIGN PATENT DOCUMENTS

JP            2000082322 A      3/2000

*Primary Examiner*—Stephen Husar
*Assistant Examiner*—Jason Han
(74) *Attorney, Agent, or Firm*—Harness, Dickey & Pierce, P.L.C.

(57) ABSTRACT

A reflecting-mirror-equipped lamp 100 including a high pressure discharge lamp 10 and a reflecting mirror 20. An opening 24 of the reflecting mirror 20 is provided with a front glass 22 and two air holes (31 and 32) are formed through the reflecting mirror 20. The air holes (31 and 32) are provided on a cross section (44) including a luminous bulb 11. If the cross section 44 is divided into regions (I through IV) consisting of first, second, third and fourth quadrants with respect to the luminous bulb 11, the air holes (31 and 32) are respectively provided in two quadrants diagonal to each other, i.e., in the first and third quadrants, respectively, or in the second and fourth quadrants, respectively.

21 Claims, 9 Drawing Sheets

LAMP WITH REFLECTING MIRROR AND IMAGE PROJECTING APPARATUS

BACKGROUND OF THE INVENTION

The present invention relates to reflecting-mirror-equipped lamps including high pressure discharge lamps and reflecting mirrors and also relates to image projecting apparatus. In particular, the present invention relates to a reflecting-mirror-equipped lamp used as a light source of a liquid crystal projector or a light source of image projecting apparatus such as a digital micromirror device (DMD) projector.

Recently, image projecting apparatus such as liquid crystal projectors and projectors using DMDs have been widely used as systems for realizing large-screen images. As a light source of such image projecting apparatus, a reflecting-mirror-equipped lamp in which a high pressure discharge lamp having high luminance is combined with a reflecting mirror is widely used in general.

Most of the reflecting-mirror-equipped lamps have a configuration in which an air hole is formed near a front glass of a reflecting mirror in order to prevent heat during operation and a cooling fan is provided near the reflecting-mirror-equipped lamp (e.g., in Japanese Laid-Open Publication No. 2000-82322).

Figure 10:
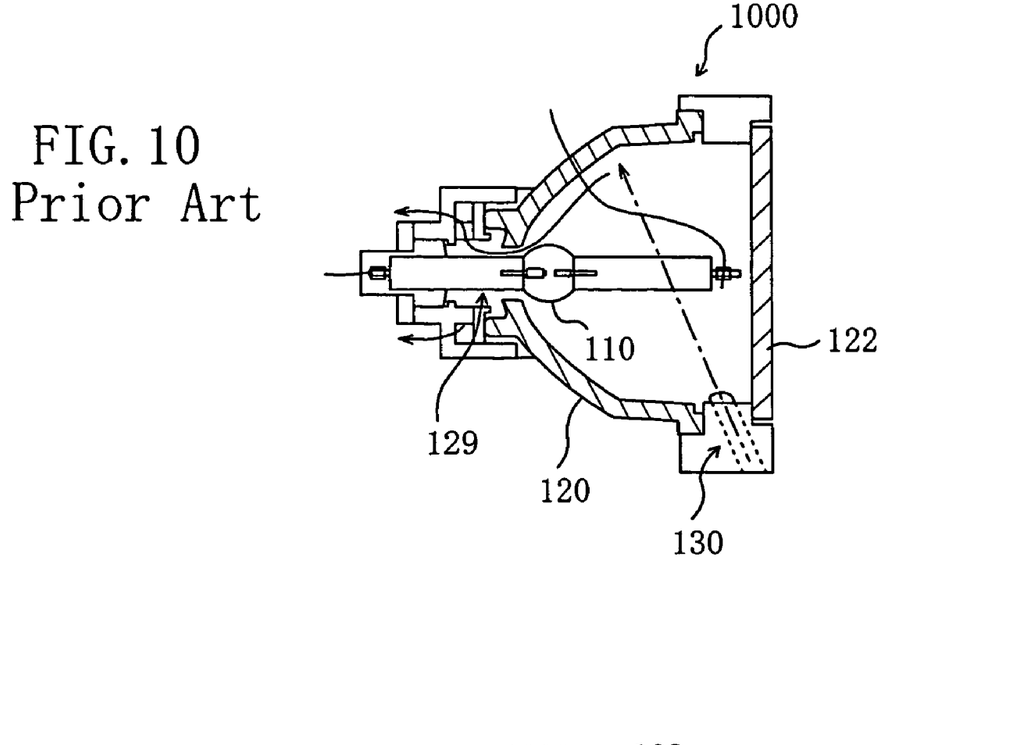
FIG. 10 is a cross-sectional view schematically showing a configuration of a prior art reflecting-mirror-equipped lamp 1000.
Figure 11A:
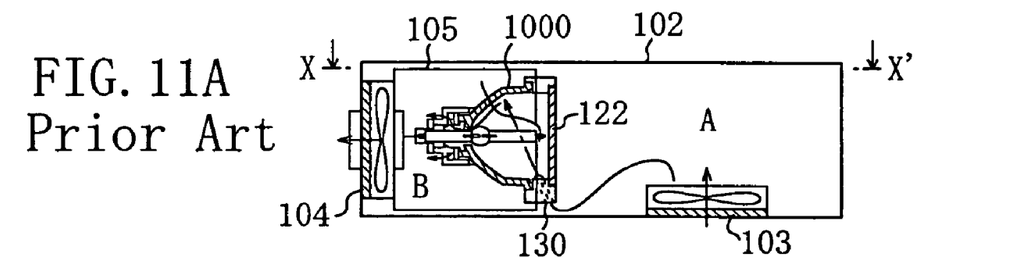
FIGS. 11A and 11B are cross-sectional views schematically showing a configuration of the prior art reflecting-mirror-equipped lamp 1000 placed in an outer casing.
Figure 11B:
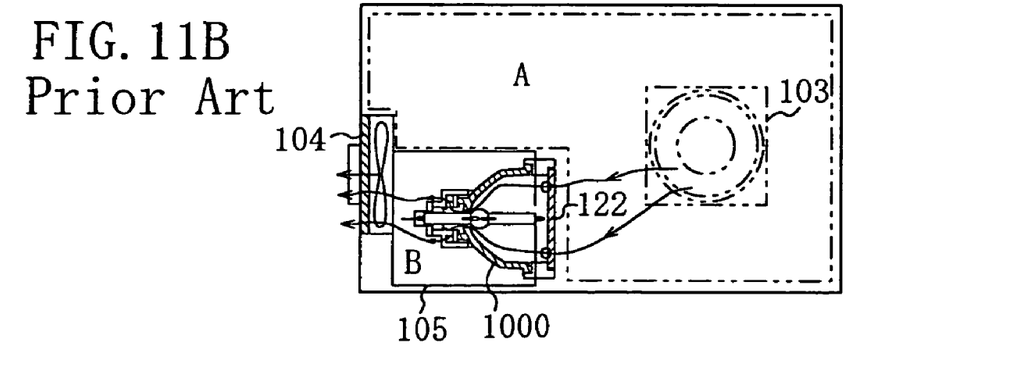

FIGS. 10 and 11 show a reflecting-mirror-equipped lamp disclosed in Japanese Laid-Open Publication No. 2000-82322. FIG. 10 shows a reflecting-mirror-equipped discharge lamp (light source unit) including a concave reflecting mirror 120 and a discharge lamp 110 fixed in the neck portion of the concave reflecting mirror 120. FIGS. 11A and 11B show a configuration in which the light source unit is placed in an outer housing 102. FIG. 11A is a vertical cross-sectional view showing the outer housing 102. FIG. 11B is a plan cross-sectional view looking downward from line X–X' in FIG. 11A.

In the light source unit 1000 shown in FIG. 10, the discharge lamp 110 is placed substantially horizontally in a differential pressure path system. Cooling air discharge openings 129 are provided in the neck portion of the concave reflecting mirror 120, and the front opening of the concave reflecting mirror 120 is provided with a translucent glass 122. A cooling air injection opening 130 with a directional property with respect to the inside of the concave reflecting mirror is provided near the front opening of the concave reflecting mirror 120.

As shown in FIGS. 11A and 11B, the light source unit 1000 is placed in the outer housing 102 provided with a suction fan 103 and an evacuation fan 104. In the outer housing 102, a partition 105 is formed so as to surround the light source unit 1000. The inside of the outer housing 102 is separated into a space A including the suction fan 103 and the air injection opening 130 of the light source unit 1000 and a space B including the evacuation fan 104 and the light source unit 1000, with the partition 105 used as a boundary.

According to Japanese Laid-Open Publication No. 2000-82322, the difference in pressure between the spaces A and B allows cooling air flown into the outer housing 102 through the suction fan 103 to flow into the light source unit 1000. Since the air injection opening 130 has a directional property, the light-emitting portion and sealing portion of the discharge lamp and the mirror surface of the reflecting mirror can be advantageously cooled.

As disclosed in Japanese Laid-Open Publication No. 2000-82322, the reflecting-mirror-equipped lamp is based on the premise that cooling fans are used in general. However, the cooling fans (i.e., the suction fan 103 and the evacuation fan 104) occupy a large area in the outer housing 102. If these cooling fans are removed, the image projecting apparatus can be further downsized. The removal of the cooling fans can, of course, reduce the cost.

However, since image projecting apparatus with higher luminance is currently in demand, high pressure discharge lamps of extremely high watts are now used. As a result, stable operation of the image projecting apparatus without using a cooling fan is very difficult.

SUMMARY OF THE INVENTION

It is therefore a main object of the present invention to provide a reflecting-mirror-equipped lamp capable of achieving compactness of image projection apparatus.

An inventive reflecting-mirror-equipped lamp includes: a high pressure discharge lamp including a luminous bulb enclosing a luminous material therein and sealing portions respectively extending from both ends of the luminous bulb; and a reflecting mirror for reflecting light emitted from the high pressure discharge lamp, wherein the reflecting mirror has an opening at the front thereof in a direction in which light is emitted, and the opening is provided with a front glass, two air holes are formed through the reflecting mirror, the two air holes are disposed on a cross section of the reflecting mirror which includes the luminous bulb and is substantially vertical to the direction in which the sealing portions extend, and if the cross section is divided into first, second, third and fourth quadrants with respect to the luminous bulb, the two air holes are respectively provided in two quadrants diagonal to each other such that the air holes are located in the first and third quadrants, respectively, or in the second and fourth quadrants, respectively.

A virtual line connecting the respective centers of the two air holes preferably touches a portion of the luminous bulb located above the center of the luminous bulb. The portion above the center of the luminous bulb is an upper half of the luminous bulb in a vertical direction.

Another inventive reflecting-mirror-equipped lamp includes: a high pressure discharge lamp including a luminous bulb enclosing a luminous material therein and sealing portions respectively extending from both ends of the luminous bulb in a substantially horizontal direction; and a reflecting mirror for reflecting light emitted from the high pressure discharge lamp, wherein the reflecting mirror has an opening at the front thereof in a direction in which light is emitted, two air holes are formed through the reflecting mirror, the two air holes are disposed at both sides of a line which is substantially vertical to the luminous bulb and passes through the center of the luminous bulb, as viewed from the opening, one of the air holes is positioned diagonally above the luminous bulb and the other is positioned diagonally below the luminous bulb, and a virtual line connecting the respective centers of the air holes touches a portion of the luminous bulb located above a horizontal line passing through the center of the luminous bulb.

In one preferred embodiment, the high pressure discharge lamp includes a luminous bulb enclosing a luminous material therein and a pair of sealing portions respectively extending from both ends of the luminous bulb, the reflecting mirror includes a wide opening located at the front thereof in a direction in which light is emitted and a narrow opening into which one of the pair of sealing portions is inserted, and a translucent member is attached to the wide opening of the reflecting mirror.

In another preferred embodiment, the reflecting-mirror-equipped lamp includes: a high pressure discharge lamp including a luminous bulb enclosing a luminous material therein and sealing portions respectively extending from both ends of the luminous bulb; and a reflecting mirror for reflecting light emitted from the high pressure discharge lamp, wherein the reflecting mirror has an opening at the front thereof in a direction in which light is emitted, and the opening is provided with a front glass, two air holes are formed through the reflecting mirror, the two air holes are disposed on a cross section of the reflecting mirror which includes the luminous bulb and is substantially vertical to the direction in which the sealing portions extend, if the cross section is divided into first, second, third and fourth quadrants with respect to the luminous bulb, the two air holes are respectively provided in two quadrants diagonal to each other such that the air holes are located in the first and third quadrants, respectively, or in the second and fourth quadrants, respectively, one of the two air holes serves as an inlet of air and the other serves as an outlet of air, during operation of the high pressure discharge lamp, and the two air holes are positioned such that air enters through the inlet, strikes an upper portion of the luminous bulb, and then goes out through the outlet, in the case where the air is in a state of natural convection.

In one preferred embodiment, no air hole which disturbs an airflow coming through the inlet, striking the upper portion of the luminous bulb, and then going out through the outlet is formed.

In one preferred embodiment, none of the two air holes is provided directly over the luminous bulb.

In one preferred embodiment, the high pressure discharge lamp is a high pressure mercury lamp including mercury enclosed in an amount of 150 mg/cm$^3$ or more.

In one preferred embodiment, the high pressure discharge lamp is a lamp of 80 W or more.

An inventive image projecting apparatus includes: the reflecting-mirror-equipped lamp; and an optical system using the reflecting-mirror-equipped lamp as a light source.

In one preferred embodiment, no cooling fan for cooling the reflecting-mirror-equipped lamp is provided.

DESCRIPTION OF THE PREFERRED EMBODIMENTS

In order to further reduce the dimensions of image projecting apparatus (projectors), which have been largely reduced in these days, the present inventors have started developing image projecting apparatus of a type using no cooling fans.

A reason of using no cooling fans is that noise caused by cooling fans has becoming a serious problem. This is because heat dissipation of a reflecting-mirror-equipped lamp (light source unit) has been more and more difficult as the body of the image projecting apparatus has been downsized year by year, so that cooling fans are required to have higher ability of cooling (the ability of producing an airflow). Another reason is that the space for setting cooling fans in the downsized image projecting apparatus body has been reduced. If the cooling fans are removed, or if cooling fans which are small in size but whose cooling ability is not so high are used, flexibility in design can be improved. Accordingly, if a reflecting-mirror-equipped lamp capable of attaining a sufficient natural cooling effect without using a cooling fan with high cooling ability is implemented, image projecting apparatus can be downsized as well as the noise caused by cooling fans can be prevented.

A technique of making a hole through a reflecting mirror of a reflecting-mirror-equipped lamp is not usually adopted because the presence of the hole reduces the area of the reflecting mirror and, therefore, also reduces the amount of emitted light. Therefore, techniques of making an air hole in a neck portion of the reflecting mirror and of providing an air hole near a wide opening of the reflecting mirror (near the front glass) are adopted so as to reduce the influence of decrease of light amount (see Japanese Laid-Open Publication No. 2000-82322). However, these techniques are based on the premise that cooling fans are present, and are almost useless when natural convection is to be utilized.

The present inventors have diligently researched and developed a reflecting-mirror-equipped lamp having cooling ability and using no cooling fans with high cooling ability, resulting in that such a reflecting-mirror-equipped lamp is achieved to make the present invention.

Hereinafter, an embodiment of the present invention will be described with reference to the drawings. In the drawings, components having substantially the same function are identified by the same reference numeral for the sake of simplicity. The present invention is not limited to the following embodiment.

Embodiment

Figure 1A:
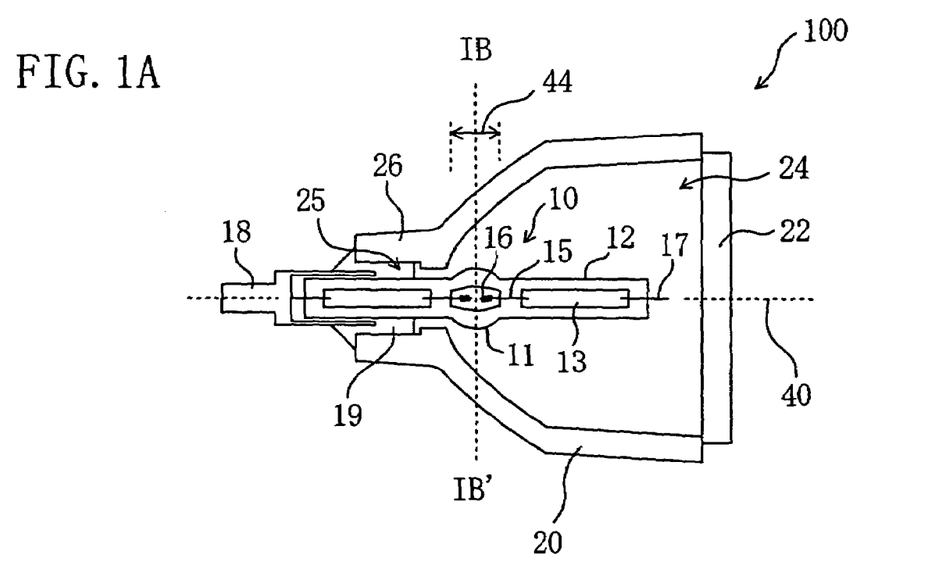
FIG. 1A is a cross-sectional view schematically showing a configuration of a reflecting-mirror-equipped lamp according to an embodiment of the present invention.
Figure 1B:
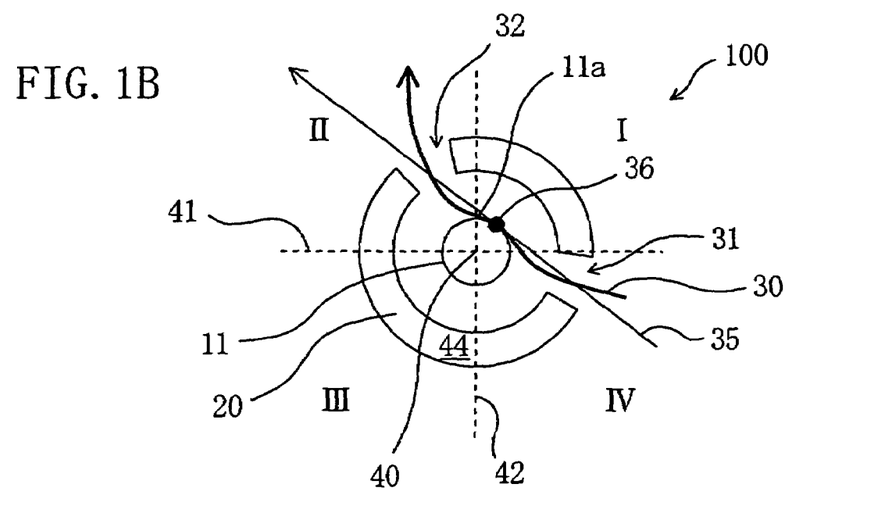
FIG. 1B is a cross-sectional view taken along line IB–IB' in FIG. 1A.

An embodiment of the present invention will be described with reference to FIGS. 1A and 1B. FIG. 1A is a cross-sectional view schematically showing a configuration of a reflecting-mirror-equipped lamp 100 according to the embodiment. FIG. 1B is a cross-sectional view taken along line IB–IB' in FIG. 1A.

As shown in FIG. 1A, the reflecting-mirror-equipped lamp of the embodiment includes: a high pressure discharge lamp 10; and a reflecting mirror 20 for reflecting light emitted from the high pressure discharge lamp 10. The high pressure discharge lamp 10 includes a luminous bulb 11 enclosing a luminous material therein. A pair of sealing portions 12 substantially horizontally extends from both ends of the luminous bulb 11.

As shown in FIG. 1B, two air holes (31 and 32) are formed through the reflecting mirror 20, and are disposed at both sides of a line 42 which is substantially vertical to the luminous bulb 11 and passes through the center of the luminous bulb 11, as viewed from a wide opening 24 of the reflecting mirror 20. One of the air holes 32 is positioned diagonally above the luminous bulb 11. The other air hole 31 is positioned diagonally below the luminous bulb 11. The vertical line 42 is a line substantially vertical (typically, at a right angle) to the direction in which the sealing portions 12 extend. A virtual line 35 connecting the respective centers of the air holes 31 and 32 preferably touches an upper portion (11a) of the luminous bulb 11 above a horizontal line 41 passing through the center of the luminous bulb 11. When an airflow strikes the upper portion 11a of the luminous bulb 11, the luminous bulb 11 is most effectively cooled.

The reflecting-mirror-equipped lamp of this embodiment is set such that the pair of sealing portions 12 extends horizontally during operation. The upper portion 11a of the luminous bulb 11 with which the virtual line 35 preferably touches is the upper half (upper hemisphere) of the luminous bulb 11 as viewed vertically during operation. In FIG. 1B, the virtual line 35 is formed by connecting the respective centers of the air holes (31 and 32) on the inner side of the reflecting mirror 20 so that the virtual line 35 touches the upper portion 11a of the luminous bulb 11 at a point represented by reference numeral 36. The resistance to the airflow is lowest at the respective center portions of the air holes 31 and 32, so that the velocity of the airflow is highest in these portions. Therefore, the portions contribute to cooling of the luminous bulb 11 most greatly.

The reflecting mirror 20 includes: the wide opening 24 positioned at the front thereof in the direction in which light is emitted; and a narrow opening 25 in which one of the sealing portions 12 of the high pressure discharge lamp 10 is inserted. A translucent member (e.g., front glass) 22 is attached to the wide opening 24 of the reflecting mirror 20. The narrow opening 25 is provided in the neck portion 26 of the reflecting mirror 20. The sealing portion 12 inserted in the narrow opening 25 is fixed in the neck portion 26 with an inorganic adhesive (e.g., cement).

A pair of opposed electrodes 15 is placed in the luminous bulb 11 of the high pressure discharge lamp 10. The electrodes 15 are electrically connected, at each end, to metal foils (molybdenum foils) 13 disposed in the respective sealing portions 12. A coil 16 is preferably winded around each head of the electrodes 15 exposed in the luminous bulb 11. The metal foils 13 are electrically connected to external leads 17 at each end. One of the external leads 17 extending from an end face of the sealing portion 12 toward the narrow portion 25 is electrically connected to a base 18. The other external lead 17 extending from an end face of the sealing portion 12 toward the wide opening 24 (the portion from which light is emitted) is electrically connected to an outward-drawn lead wire (not shown) electrically connected to an external circuit. The high pressure discharge lamp 10 of this embodiment is a double end type discharge lamp and is installed in the reflecting mirror 20 such that the center axis 40 of the lamp is positioned in a substantially horizontal direction.

Now, the configuration of this embodiment will be further described. The reflecting mirror 20 is a parabolic mirror or an ellipsoidal mirror, for example, and is designed and fabricated with very high precision so as not to deteriorate optical characteristics of the lamp. Since the front glass 22 is attached to the wide opening 24 positioned at the front of the reflecting-mirror-equipped lamp 100 in the direction in which light is emitted, a substantially airtight structure is attained if the presence of the air holes (31 and 32) is not take into consideration. Accordingly, in the event of breakage of the lamp, the configuration fully prevents the shattering of the lamp.

Though the two air holes (31 and 32) formed through the reflecting mirror 20 are disposed in a region 44 including a cross section in which the luminous bulb 11 is located in the vertical direction, none of the air holes (31 and 32) is formed directly above the luminous bulb 11 in the vertical direction. None of the air holes (31 and 32) is also formed directly under the luminous bulb 11. In other words, the two air holes (31 and 32) are disposed on a cross section (44) of the reflecting mirror 20 which includes the luminous bulb 11 and is substantially vertical to the direction (40) in which the sealing portions 12 (or the electrodes 15) extend. If the cross section 44 is divided into regions (I through IV) consisting of first, second, third and fourth quadrants with respect to the luminous bulb 11 (or the electrodes 15), the two air holes are respectively positioned in two quadrants diagonal to each other, i.e., in the first and third quadrants, respectively, or in the second and fourth quadrants, respectively. As described above, the air holes 31 and 32 are preferably formed through the reflecting mirror 20 such that the virtual line 35 connecting the centers of the air holes 31 and 32 touches the upper portion 11a of the luminous bulb 11 located above the center thereof.

If the air holes (31 and 32) are thus provided in the reflecting mirror 20, a natural wind enters through the lower air hole (intake hole) 31, then strikes the upper portion 11a of the luminous bulb 11, and then goes out through the upper air hole (exhaust hole) 32. That is to say, the configuration shown in FIGS. 1A and 1B allows the airflow to enter through the inlet 31, strike the upper portion 11a of the luminous bulb 11, and then go out through the outlet 32, without causing forced convection by using a cooling fan. An examination done by the present inventors shows that the temperature at the upper portion 11a of the luminous bulb 11, which was 992.5° C. in the case of no air holes, surprisingly decreases to as low as 985.3° C. in the case where the air holes 31 and 32 are provided, i.e., decreases by as much as about 7° C., without using s cooling fan.

Figure 2A:
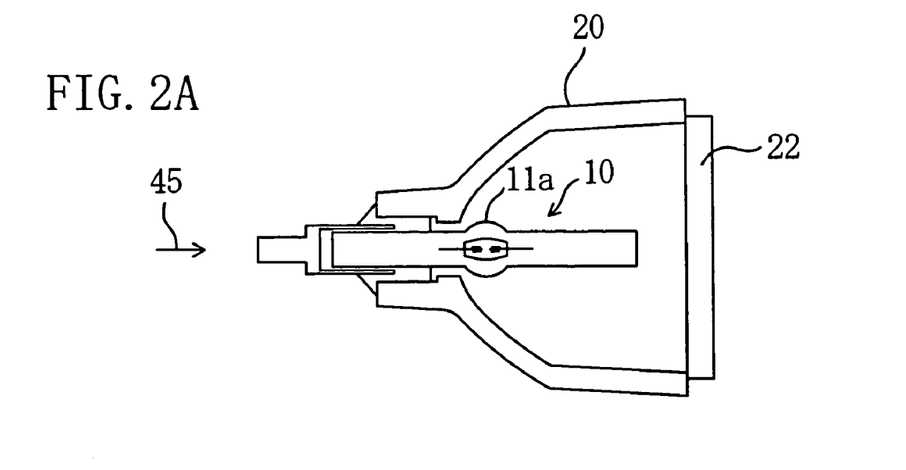
FIG. 2A is a side view schematically showing a configuration of the reflecting-mirror-equipped lamp of the embodiment of the present invention.
Figure 2B:
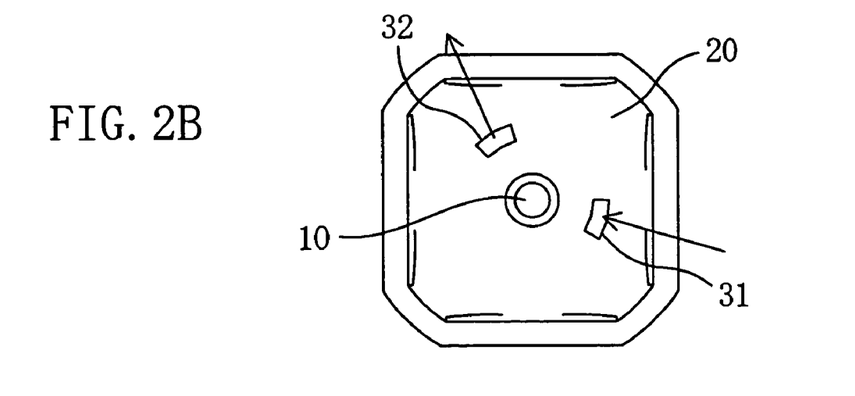
FIG. 2B is a back view showing the configuration in FIG. 2A.
Figure 2C:
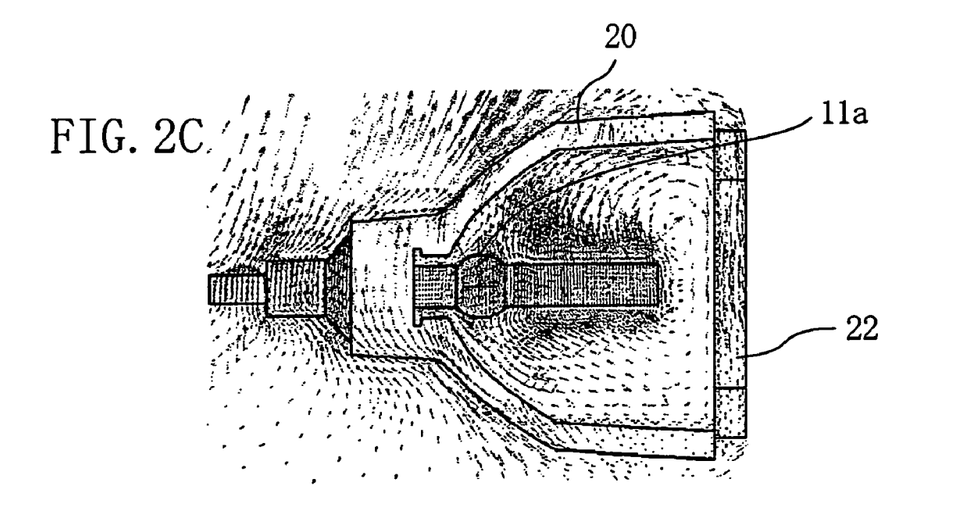
FIG. 2C is a view showing a simulation on an airflow inside the reflecting-mirror-equipped lamp.

The configuration of this embodiment will be further described with reference to FIGS. 2A through 2C. FIG. 2A is a side view schematically showing the reflecting-mirror-equipped lamp of this embodiment. FIG. 2B is a back view as viewed in the direction of an arrow 45 in FIG. 2A. FIG. 2C is a view showing a simulation on an airflow inside the reflecting-mirror-equipped lamp.

As shown in FIG. 2B, the air holes 31 and 32 are respectively provided in two quadrants diagonal to each other (e.g., the first and third quadrants, respectively, or the second and fourth quadrants, respectively) with respect to the lamp 10 such that in the case of natural convection, the airflow enters through the air hole (inlet) 31, strikes the upper portion 11a of the luminous bulb 11 and then goes out through the air hole (outlet) 32. As shown in FIG. 1B, the air holes 31 and 32 are formed through the reflecting mirror 20 such that the line 35 connecting the respective centers of the air holes 31 and 32 touches the upper portion 11a of the luminous bulb 11. The air holes 31 and 32 are positioned within a cross section including a region where the luminous bulb 11 is present.

As shown in FIG. 2C, a result of the simulation also shows that it is possible to have the airflow due to natural convection generated by heat during lamp operation strike the upper portion 11a of the luminous bulb 11 in the reflecting-mirror-equipped lamp including the reflecting mirror 20 provided with the air holes 31 and 32.

To have the natural wind strike the upper portion 11a of the luminous bulb 11, provision of an air hole directly above the luminous bulb 11 or provision of three or more air holes seems to be more effective. However, a study on more than a dozen variations of arrangements of air holes made by the present inventors shows that no success was attained with any of the arrangements except for the configuration of this embodiment as shown in FIGS. 2A through 2C. In a configuration in which only one air hole is provided in a hermetically-sealed reflecting mirror equipped with a front glass, no natural wind blows through the configuration, so that the upper portion 11a of the luminous bulb 11 is not cooled only with natural convection.

Figure 3:
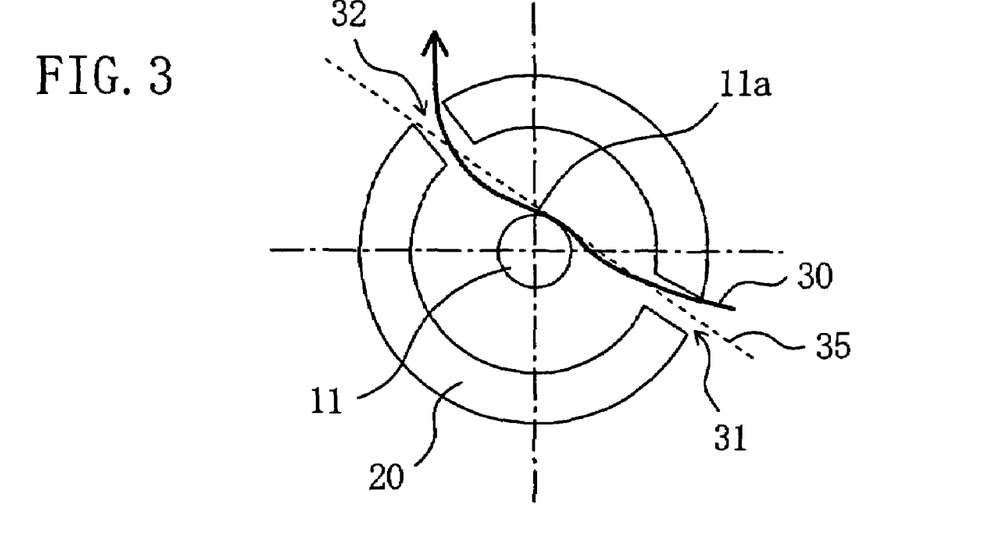
FIG. 3 is a cross-sectional view schematically showing a configuration of the reflecting-mirror-equipped lamp of the embodiment of the present invention.
Figure 4:
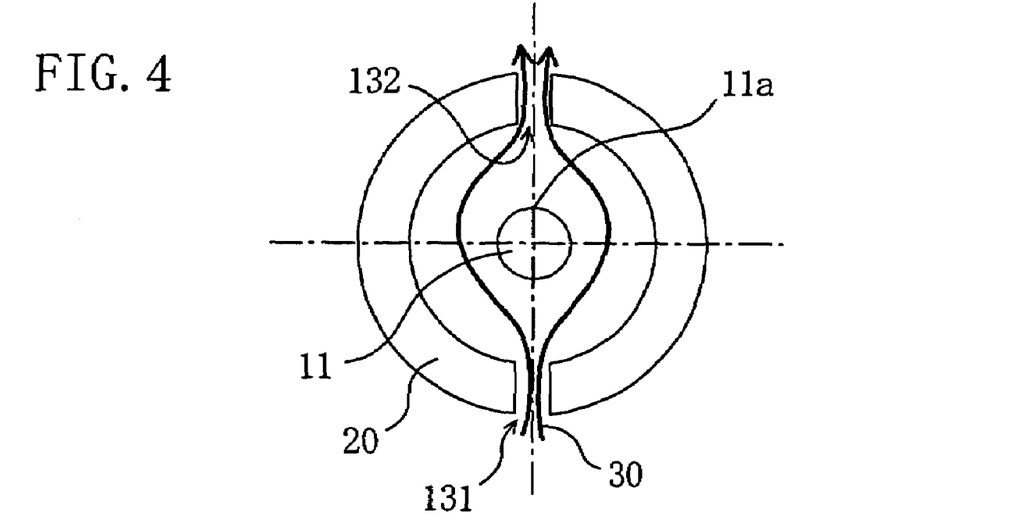
FIG. 4 is a cross-sectional view schematically showing a configuration of a comparative reflecting-mirror-equipped lamp.

In a configuration shown in FIG. 3, none of the air holes 31 and 32 is provided in a region directly over the luminous bulb 11. On the other hand, FIG. 4 shows a configuration in which an air hole 132 is provided directly over the luminous bulb 11 and another air hole 131 is provided directly under the luminous bulb 11. The provision of the air hole 132 directly above the upper portion 11a of the luminous bulb 11 seems to allow the upper portion 11a of the luminous bulb 11 to be cooled with the natural wind. However, the study done by the present inventors shows that the natural wind 30 blows near the side face of the luminous bulb 11, but does not strike the upper portion 11a of the luminous bulb 11. Accordingly, in the configuration shown in FIG. 4, the upper portion 11a of the luminous bulb 11 is not cooled.

Figure 5:
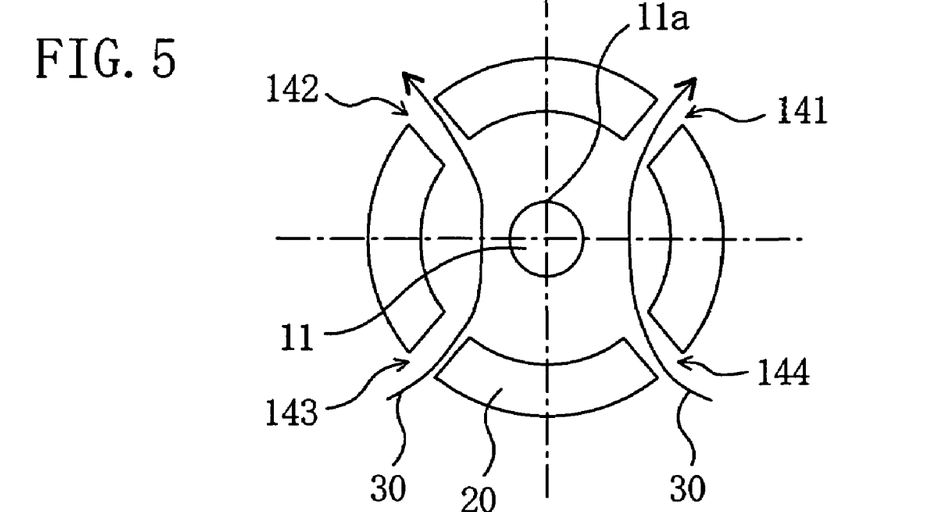
FIG. 5 is a cross-sectional view schematically showing a configuration of a comparative reflecting-mirror-equipped lamp.

FIG. 5 shows a configuration in which four air holes are provided. The air holes 141 through 144 are positioned in the first through fourth quadrants, respectively, with respect to the luminance bulb 11. As compared to the configuration shown in FIG. 3 with only two air holes, the configuration with four air holes seems to be more effective at cooling the upper portion 11a of the luminous bulb 11 with the natural wind. However, the study done by the present inventors shows that the natural wind 30 blows near the side face of the luminous bulb 11, but does not strike the upper portion 11a of the luminance bulb 11. Accordingly, even with the configuration shown in FIG. 5, the upper portion 11a of the luminous bulb 11 is not cooled.

Figure 6:
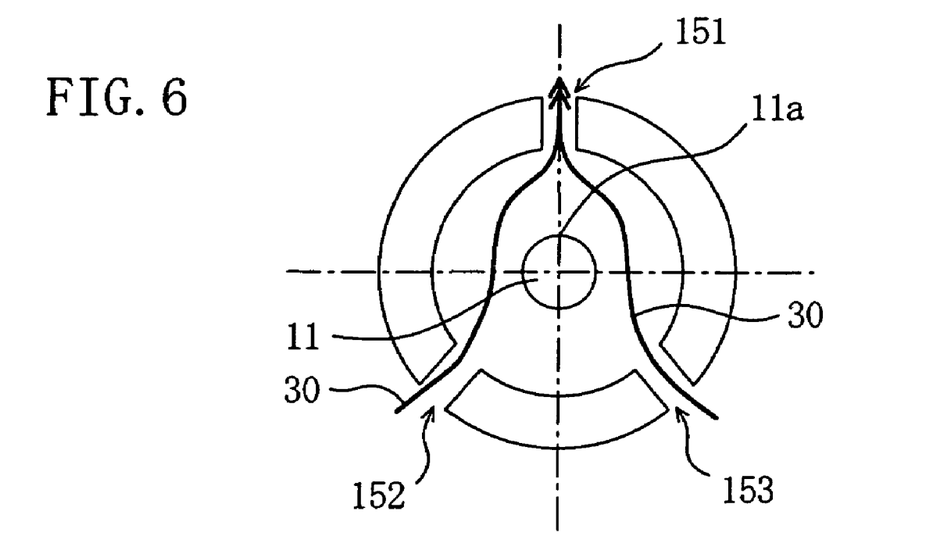
FIG. 6 is a cross-sectional view schematically showing a configuration of a comparative reflecting-mirror-equipped lamp.

FIG. 6 shows a configuration in which three air holes are provided. In this configuration with the three air holes (151 through 153), the natural wind 30 also does not strike the upper portion 11a of the luminance bulb 11, so that the upper portion Ha of the luminance bulb 11 is not cooled. Therefore, although it is possible to produce an airflow which enters through the inlet 31, strikes the upper portion 11a of the luminance bulb 11 and then goes out through the outlet 32 in the configuration shown in FIG. 3, such an airflow is disturbed in the other configurations shown in FIGS. 4 through 6. That is to say, no air holes disturb the airflow in the configuration shown in FIG. 3.

In addition, in the reflecting-mirror-equipped lamp of this embodiment, no air holes are provided around the neck portion 26 of the reflecting mirror 20. Provision of air holes around the neck portion 26 of the reflecting mirror 20 in addition to air holes in the reflecting surface of the reflecting mirror 20 seems to be more effective at cooling the upper portion 11a of the luminance bulb 11 with the natural wind. However, the study done by the present inventors shows that the additional provision of air holes around the neck portion 26 of the reflecting mirror 20 might disturb or weaken the airflow toward the upper portion 11a of the luminance bulb 11.

Figure 7A:
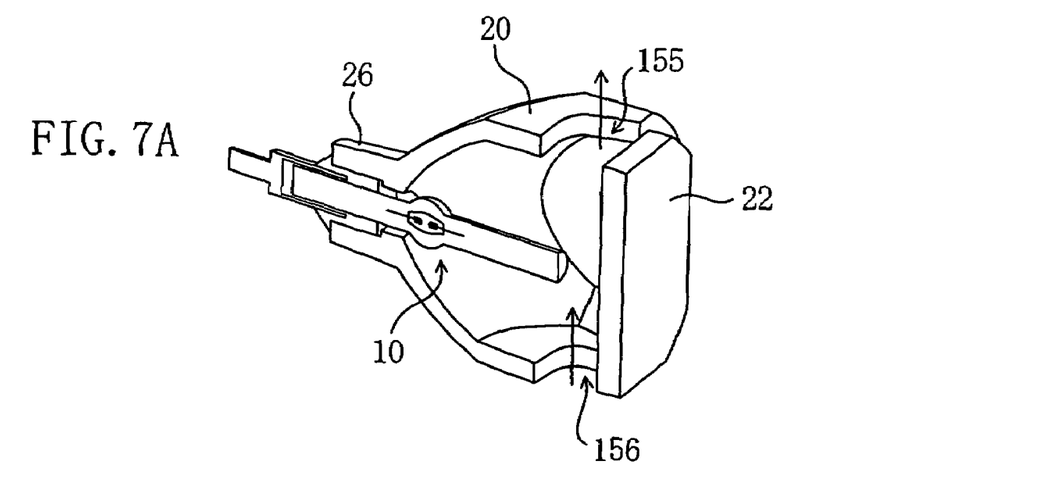
FIG. 7A is a perspective cross-sectional view showing a configuration of a comparative reflecting-mirror-equipped lamp.
Figure 7B:
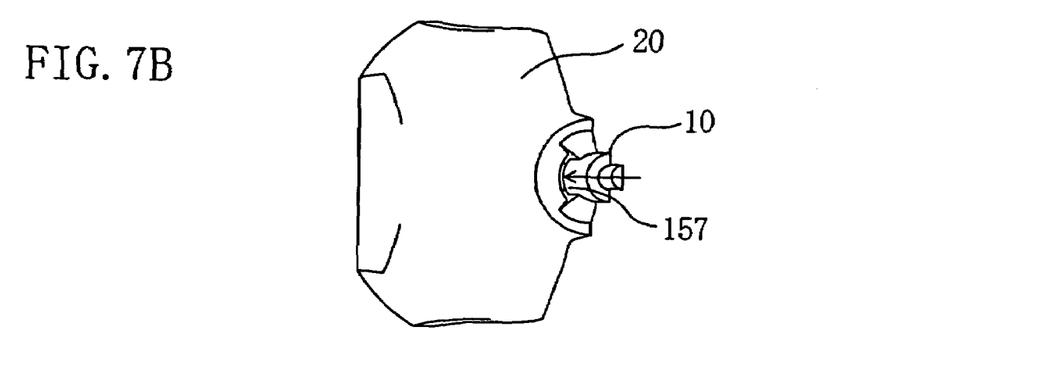
FIG. 7B is a perspective back view showing the configuration in FIG. 7A.
Figure 7C:
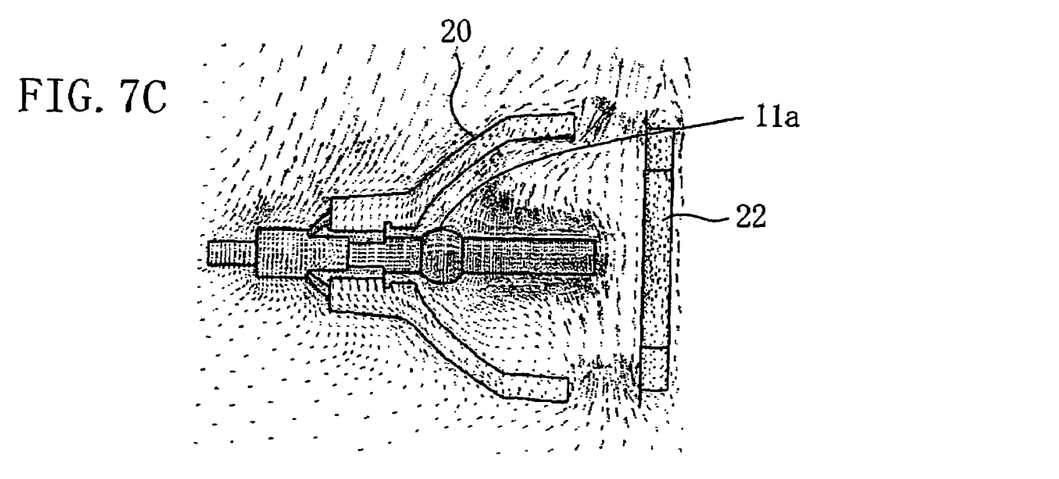
FIG. 7C is a view showing a simulation on an airflow in the inside of the reflecting-mirror-equipped lamp.

FIG. 7A is a perspective cross-sectional view schematically showing a configuration in which air holes are provided through the top and bottom of the reflecting mirror near the front glass and the other air holes are provided horizontally through the sides of the neck portion in which the lamp is inserted. FIG. 7B is a back view showing (a half of) the configuration shown in FIG. 7A. FIG. 7C is a view showing a simulation on an airflow in this configuration.

In the configuration shown in FIGS. 7A though 7C, the four air holes in total are respectively provided at the top and the bottom near the front side and at both sides of the neck portion 26. However, the result of the simulation shown in FIG. 7C is lower than that obtained in this embodiment shown in FIG. 2C. As compared to the configuration of FIG. 2C, the natural wind (cooling wind) does not strike effectively (or only a light wind strikes) the upper portion 11a of the luminance bulb 11 in the configuration shown in FIG. 7C. Accordingly, it was found that the upper portion 11a of the luminance bulb 11 is not effectively cooled in the configuration shown in FIGS. 7A though 7C.

The configuration shown in FIGS. 7A through 7C seems to allow the airflow which has entered through, for example, the air hole 156 to cool the upper portion 11a of the luminance bulb 11 before going out through the holes 155 and 157. However, the study done by the present inventors shows that it is difficult to have the cooling wind blow strongly toward the neck portion (lamp insertion portion) only with natural convection. The study also shows that in the configuration shown in FIGS. 7A through 7C, the temperature at the upper portion 11a of the luminance bulb 11, which was 992.5° C. in the case of no air holes, decreases to 990.6° C. in the case where air holes such as the air hole 155 are provided. That is to say, it was found that the temperature decreases only by about 2° C. in spite of the provision of as much as four air holes.

Figure 8A:
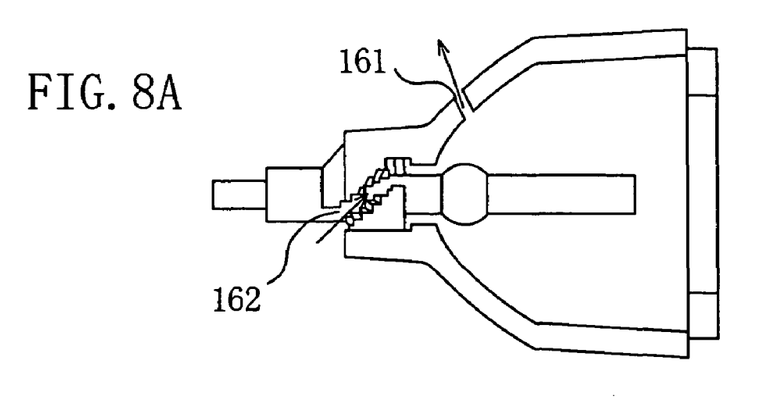
FIG. 8A is a perspective cross-sectional view showing a configuration of a comparative reflecting-mirror-equipped lamp.
Figure 8B:
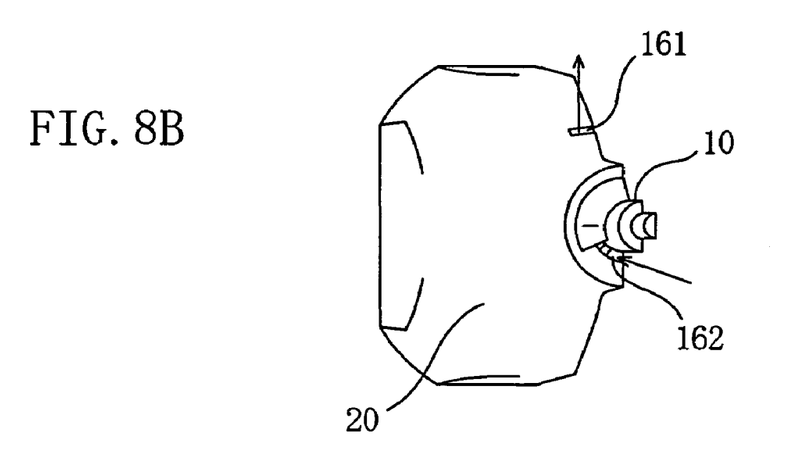
FIG. 8B is a perspective back view showing the configuration in FIG. 8A.
Figure 8C:
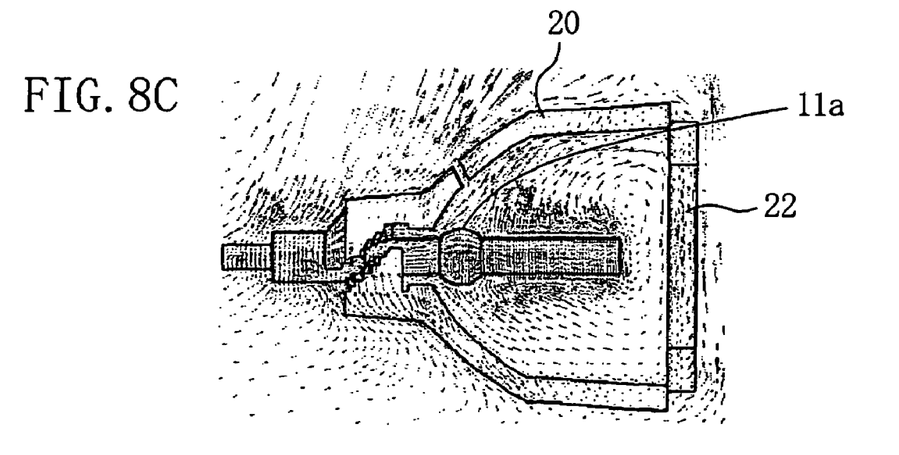
FIG. 8C is a view showing a simulation on an airflow in the inside of the reflecting-mirror-equipped lamp.

In a configuration shown in FIGS. 8A through 8C, an air hole penetrating through the reflecting mirror 20 obliquely and provided directly over the luminous bulb and air holes provided horizontally through both sides of the neck portion 26 and each penetrating the neck portion 26 in a downward slanting direction toward the inside. The result of the simulation shown in FIG. 8C is lower than that obtained in this embodiment shown in FIG. 2C, as in the case of FIG. 7C.

That is to say, in the case of FIG. 8C, the natural wind (cooling wind) does not effectively strike (or only a light wind strikes) the upper portion 11a of the luminance bulb 11, resulting in that the upper portion 11a of the luminance bulb 11 is not cooled effectively. In the configuration shown in FIGS. 8A through 8C, the temperature at the upper portion 11a of the luminance bulb 11, which was 992.5° C. in the case of no air holes, decreases only to 991.7° C. in the case where air holes such as the air hole 161 are provided. That is to say, the temperature decreases by only about 0.8° C.

The present inventors studied other variations of arrangements of air holes. However, the temperature decreases by only about 1° C. or less in any of the arrangements (2° C., at most, in the configuration shown in FIGS. 7A through 7C). That is to say, the decrease by about 7° C. attained in the configuration of this embodiment is exceptionally outstanding.

Figure 9A:
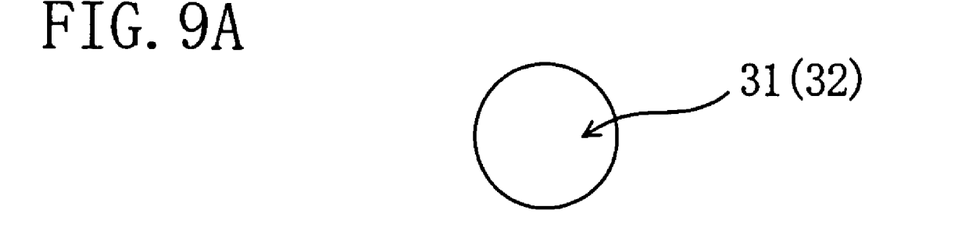
FIG. 9A is a view showing a substantially circular air hole.
Figure 9B:
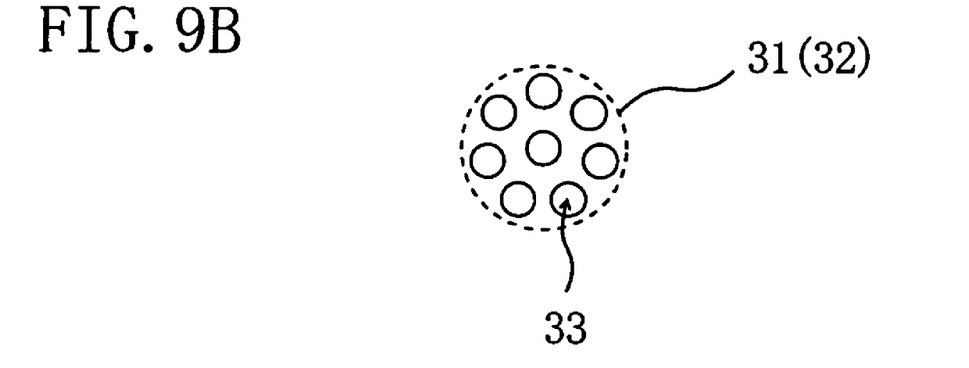
FIG. 9B is a view showing an air hole constituted by a plurality of through holes.
Figure 9C:
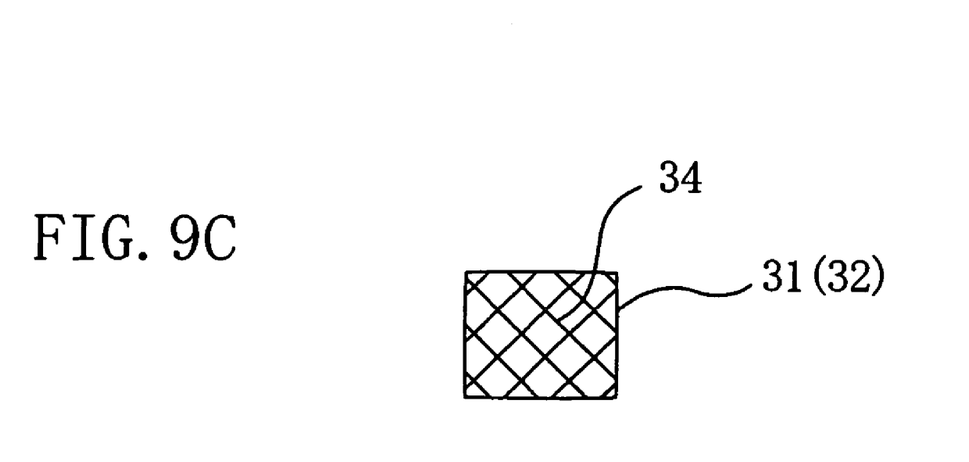
FIG. 9C is a view showing an air hole with a mesh.

Each of the air holes 31 and 32 in this embodiment has a rectangular shape in FIG. 2B, but may be substantially circular (e.g., circular, ellipsoidal or oval) as shown in FIG. 9A. Alternatively, one of or both of the air holes 31 and 32 may be made of a plurality of through holes as shown in FIG. 9B. If a plurality of through holes, not one through hole, constitute the air hole 31 or 32, contact resistance to the airflow passing therethrough increases disadvantageously. However, since the size of each of the through holes is small, another advantage that shattered pieces of the lamp are less likely to burst out in the event of breakage of the lamp is obtained. To obtain such another advantage, a mesh 34 covering one or more through holes may be provided as shown in FIG. 9C.

Now, preferred conditions of this embodiment will be described using examples. The luminous bulb 11 of the high pressure discharge lamp 10 is substantially spherical and made of quartz glass. Examples of the high pressure discharge lamp 10 include high pressure mercury lamps and metal halide lamps (including mercury-free metal halide lamps). In this embodiment, an alternating current operation type high pressure mercury lamp is used. To achieve a high pressure mercury lamp (in particular, an extra-high pressure mercury lamp) exhibiting excellent characteristics such as a long lifetime, high purity quartz glass having a low level of alkali metal impurities (e.g., the mass of each type of alkali metal is 1 ppm or less) is preferably used as the quartz glass constituting the luminous bulb 11. It is of course possible to use quartz glass having a regular level of alkali metal impurities. The outside diameter of the luminous bulb 11 is, for example, about 5 mm to 20 mm, and the glass thickness of the luminous bulb 11 is, for example, about 1 mm to 5 mm. The volume of the discharge space in the luminous bulb 11 is, for example, about 0.01 to 1 cc (i.e., 0.01 to 1 cm$^3$). In this embodiment, the luminous bulb 11 has an outside diameter of about 9 mm, an inside diameter of about 4 mm and a volume of the discharge space of about 0.06 cc.

The pair of opposed electrodes (electrode rods) 15 is disposed in the luminous bulb 11. The heads of the electrodes 15 are arranged in the luminous bulb 11 with a distance (arc length) D of about 0.2 to 5 mm (e.g., 0.6 to 1.0 mm) therebetween, and each of the electrodes 15 is made of tungsten (W). It is preferable to wind a coil (e.g., a coil made of tungsten) around each head of the electrodes 15 for the purpose of reducing the temperature of the electrode heads during lamp operation.

The sealing portions 12 include: the metal foils 13 electrically connected to the respective electrodes 15; and glass portions extending from the luminous bulb 11. The airtightness of the discharge space in the luminous bulb 11 is maintained by sealing the metal foils 13 with the glass portions. The glass portions of the sealing portions 12 are made of, for example, quartz glass. Each of the metal foils 13 is, for example, a molybdenum foil (Mo foil) and has, for example, a rectangular shape. If the sealing portions 12 are formed by a shrinkage technique, the portions 12 have a substantially circular shape in cross section, and the metal foils 13 are positioned at the respective center portions of the sealing portions 12. The base 18 shown in FIG. 1A may be omitted.

In the luminous bulb 11, mercury is enclosed as a luminous material. When the lamp 10 is operated as an extra-high pressure mercury lamp, for example, mercury in an amount of about 150 mg/cc or more (150 to 200 mg/cc or more), a rare gas (e.g., argon) at 5 to 30 kPa, and a small amount of halogen, if necessary, are enclosed in the luminous bulb 11.

The halogen enclosed in the luminous bulb 11 serves for a halogen cycle that returns tungsten (W) that has evaporated from the electrodes 15 during lamp operation to the electrodes 15, and is, for example, bromine. The halogen to be enclosed may be in the form of a single substance or in the form of a halogen precursor (form of a compound). In this embodiment, halogen in the form of $CH_2Br_2$ is introduced into the luminous bulb 11. The amount of $CH_2Br_2$ enclosed in this embodiment is about 0.0017 to 0.17 mg/cc, and this corresponds to about 0.01 to 1 $\mu$mol/cc when expressed by a halogen atom density during lamp operation. The strength against pressure (operating pressure) of the lamp 10 is 15 to 20 MPa or more. The rated power is, for example, 80 W or more, and is preferably 150 W (which corresponds to a load at the bulb wall of about 130 W/cm$^2$) or more if the characteristic of high output is to be remarkable. The load at the bulb wall is, for example, about 130 W/cm$^2$ or more, and the upper limit is not particularly set. For example, a lamp having a load at the bulb wall in the range from about 130 W/cm$^2$ or more to about 300 W/cm$^2$ (preferably about 130 to 200 W/cm$^2$) can be achieved.

In the reflecting-mirror-equipped lamp 100 of this embodiment, since holes (air holes) are formed through part of the reflecting mirror 20, the area of the reflecting surface of the reflecting mirror 20 is reduced. Therefore, such a configuration as to reduce the area of the reflecting mirror 20 is not generally adopted. However, in this embodiment, the area of the reflecting mirror 20 is reduced on purpose in order to cool the lamp 10 with the cooling wind due to natural convection without using a cooling fan. Accordingly, a high pressure discharge lamp 10 with higher output is preferably used also in order to compensate for an amount of light, which has decreased due to the reduction of the area.

The maximum diameter of the reflecting surface of the reflecting mirror 20 is preferably 45 mm or less, and is more preferably 40 mm or less in order to satisfy a demand for further compactness. The reflecting mirror 20 is of a substantially airtight structure formed by attaching the front glass 22 to the wide opening 24 of the reflecting mirror 20. Through holes may be provided in addition to the air holes 31 and 32 so long as the holes do not disturb the airflow entering through the air hole (inlet) 31, striking the upper portion 11a of the luminous bulb 11, and then going out through the air hole (outlet) 32. Examples of such through holes include a through hole for guiding an outward-drawn lead wire, which is to be electrically connected to the external lead 17 positioned toward the side from which light is emitted, from the inside of the reflecting mirror 20 to the outside. The inner volume of the reflecting mirror 20 defined by the front glass 22 and the reflecting surface of the reflecting mirror 20 is preferably 200 cm³ or less, for example. With respect to the reflecting mirror 20 of this embodiment and its focal point, the diameter φ of the wide opening 24 is about 45 mm, and the depth Dp of the reflecting mirror 20 is about 33 mm, for example. Even if the reflecting surface of the reflecting mirror 20 is circular when viewed from the front thereof, it is possible to make a portion of the reflecting mirror 20 to which the front glass 22 is to be attached in the shape of a rectangle or a square. The volume of the reflecting mirror 20 is about 40000 mm³, i.e., about 40 cc. If the reflecting mirror 20 is of an ellipsoidal mirror type, the distance from the deepest portion of the reflecting mirror 20 to the focal points F1 and F2 are about 8 mm and about 64 mm, respectively.

The size of each of the air holes 31 and 32 may be defined appropriately depending on the size of the reflecting mirror 20 of the reflecting-mirror-equipped lamp 100 or the ability of the lamp 10. For example, the area of each of the air holes 31 and 32 is 26.5 mm². The area of each of the air holes 31 and 32 is preferably more than or equal to 10 mm² and less than or equal to 50 mm². If the area is less than 10 mm², the amount of air due to natural convection is not enough to perform cooling adequately, whereas if the area is more than 50 mm², the amount of light to be reflected is small so that the lamp is improper as a light source. In addition, in the configuration shown in FIG. 1B, the air hole 31 is located at an angle from 45° to 75°, for example, with respect to a horizontal axis 41 with the lamp center axis 40 taken as its origin. On the other hand, the air hole 32 is located at an angle from 60° to 90°, for example, with respect to a vertical axis 42 with the lamp center axis 40 taken as its origin. The air holes 31 and 32 can be formed by drilling holes through predetermined portions of the reflecting mirror after the completion of the mirror and then filing the holes into rectangular shapes (i.e., substantially rectangular cutouts). In the case of circular holes (substantially circular cutouts), only drilling is enough to make the holes. Since the air hole 32 of the reflecting mirror does not reflect light, the amount of emitted light is reduced in part so that it becomes darker. The air hole 32 is preferably made rectangular, so that it becomes less dark than in the case where the air hole 32 is made circular.

To have the cooling air due to natural convection strike the upper portion 11a of the luminous bulb 11, the lamp 100 is preferably configured such that the virtual line 35 connecting the centers of the air holes 31 and 32 touches the portion (11a) above the horizontal line 41 passing through the center of the luminous bulb 11. However, the configuration in which the two air holes 31 and 32 are respectively provided in two quadrants diagonal to each other, e.g., in the first and third quadrants, respectively, or in the second and fourth quadrants, respectively, is more effective at cooling a part (e.g., side face) of the luminous bulb 11 than the configuration in which the air holes 31 and 32 are not disposed diagonally (e.g., FIGS. 4 through 8), though it is difficult to cool the upper portion 11a of the luminous bulb 11 effectively. In this case, a virtual line connecting the upper edges of the respective air holes 31 and 32 is preferably positioned above the center of the luminous bulb 11.

In the reflecting-mirror-equipped lamp 100 of this embodiment, two air holes (31 and 32) are positioned on a cross section (44) of the reflecting mirror 20 which includes the luminous bulb 11 and is substantially vertical to a direction (40) in which the sealing portions 12 extend. The two air holes (31 and 32) are respectively provided in two quadrants diagonal to each other (e.g., in the first and third quadrants, respectively, or in the second and fourth quadrants, respectively), so that it is possible to cool the luminous bulb 11 by taking the air through the air hole 31 and utilizing natural convection generated by heat during lamp operation. If the virtual line 35 connecting the centers of the air holes 31 and 32 is located to touch a portion (11a) above the horizontal line 41 passing through the center of the luminous bulb 11, the cooling wind 30 due to natural convection that has entered through the air hole 31 cools the upper portion 11a of the luminous bulb 11 before going out through the air hole 32, so that the high pressure discharge lamp 10 is more effectively cooled. Accordingly, it is possible to cool the high pressure discharge lamp 10 without using a cooling fan in the image projecting apparatus, so that the image projecting apparatus can be downsized. In addition, noise caused by a cooling fan is eliminated, so that cost reduction can be achieved by not using a cooling fan. Even in the case where a cooling fan is to be used, if a cooling fan having low cooling ability is adopted, a great effect is obtained. Specifically, since a cooling fan having low cooling ability is relatively small, the compactness of the image projecting apparatus can be achieved. In addition, the cooling fan with low cooling ability is quiet and produced at a low cost, so that noise reduction as well as cost reduction can be achieved. In the case of using a cooling fan, both of the suction fan and the evacuation fan are used in the configuration shown in FIG. 11. However, according to this embodiment, a configuration using only one of these fans can be adopted. In such a case, the compactness of the image projection apparatus can be also achieved.

The capability of securing flexibility in design in order to meet the current demand of compactness of the image projecting apparatus is very significant. If the image projecting apparatus has a configuration including no cooling fan or a cooling fan having low cooling ability and not using the air holes 31 and 32 for the purpose of meeting the demand of compactness, the lifetime of a reflecting-mirror-equipped lamp used therein is shortened because of a large amount of heat generated from the currently-used high-output lamp. Although the lifetime of high pressure discharge lamps for image projecting apparatus has been largely improved due to the recent advancement of research and development, a short lifetime of the lamp in the state of being incorporated in the image projecting apparatus largely degrades the technical value of the long-life high pressure discharge lamp. The reflecting-mirror-equipped lamp 100 of this embodiment is also significant technically in preventing such a decrease of the lifetime.

The reflecting-mirror-equipped lamp 100 of this embodiment can be installed in image projecting apparatus such as a liquid crystal projector or a projector using a DMD without change or in the form of a lamp unit in combination with a lamp house for supporting the reflecting-mirror-equipped lamp. If such a reflecting-mirror-equipped lamp (or lamp unit) and an optical system including an image element (e.g., a digital micromirror device (DMD) panel or a liquid crystal panel) are combined, image projecting apparatus is obtained. For example, projectors (digital light processing (DLP) projectors) using DMDs or liquid crystal projectors (including reflective projectors using a liquid crystal on silicon (LCOS) structure) can be provided.

Figure 12:
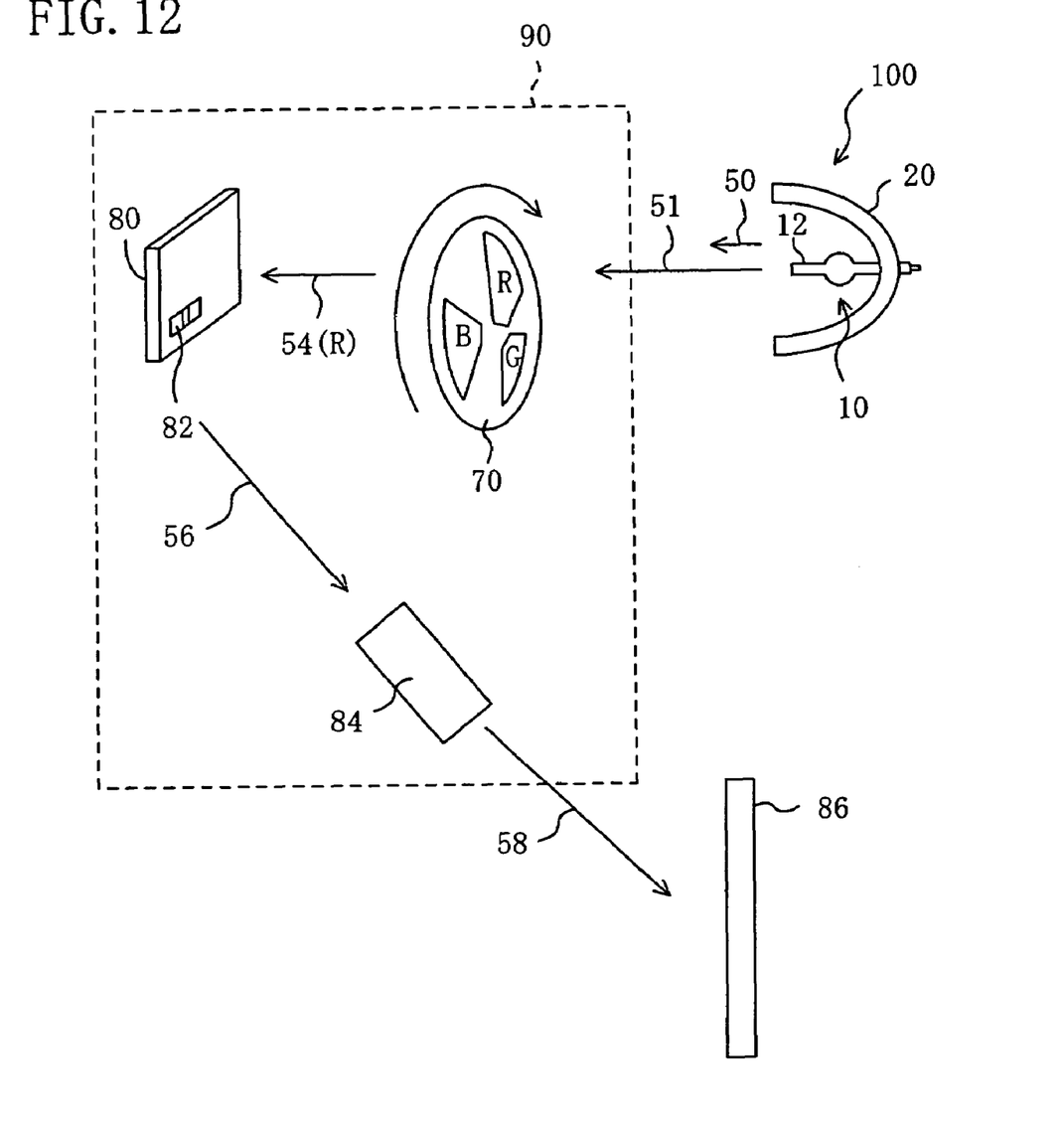
FIG. 12 is a view schematically showing image projecting apparatus using the reflecting-mirror-equipped lamp of the embodiment of the present invention as a light source.

For example, the reflecting-mirror-equipped lamp 100 of this embodiment can be used as the light source for the DLP projector, as shown in FIG. 12. FIG. 12 is a schematic view showing the structure of a single panel DLP projector, and the DLP projector shown in FIG. 12 includes the reflecting-mirror-equipped lamp 100 and an optical system 90. The optical system 90 includes a color foil 70 disposed forward in the emission direction 50 of the reflecting-mirror-equipped lamp 100, a DMD panel 80 (constituted by a plurality of DMDs 82) for reflecting light 54 that has passed through the color foils 70, a projection lens 84 for converting light 56 projected from the DMD panel 80 to projection light 58 to form images on a screen 86.

After the light 51 emitted from the reflecting-mirror-equipped lamp 100 has passed through one color (e.g., R) of three primary colors (R, G and B) of the color foil 70 rotating, for example, at a rotation speed of 120 rotations per second, the light is projected to the DMD panel 80 via a condensing lens (not shown), and then images are formed on the screen 86. In the case of a single panel DLP projector, the DMDs 82 of the DMD panel 80 are turned on and off repeatedly at a speed of several thousand or several ten thousand times per second, so that the colors of R, G and B that have passed through the color foil 70 are superimposed instantly so as to form a picture on the screen 86, utilizing an afterimage effect of human eyes.

Furthermore, the reflecting-mirror-equipped lamps of this embodiment can be used preferably, not only as a light source of image projecting apparatus, but also for other applications, such as a light source for ultraviolet ray steppers or a light source for sport stadium, a light source for automobile headlights, and a floodlight for illuminating traffic signs. In the case of being used as a light source for a floodlight, for example, the center axis 40 of the lamp and the horizontal axis 41 might not be substantially horizontal. In such a case, the configuration of this embodiment is defined with these axis set horizontal.

In the foregoing embodiment, the present invention has been described with respect to the preferred embodiment. However, the present invention is not limited to this embodiment and, of course, various modification can be applied.

According to the present invention, two air holes are provided on a cross section of a reflecting mirror which includes a luminous bulb 11 and substantially vertical to a direction in which sealing portions extend. The two air holes are respectively provided in two quadrants diagonal to each other, so that air can be taken into through one of the air holes to effectively cool the luminous bulb 11 by utilizing natural convection generated by heat during lamp operation. As a result, a reflecting-mirror-equipped lamp capable of achieving compactness of image projecting apparatus can be provided.

What is claimed is:

1. A reflecting-mirror-equipped lamp comprising:
a high pressure discharge lamp including a luminous bulb enclosing a luminous material therein and sealing portions respectively extending from both ends of the luminous bulb; and
a reflecting mirror for reflecting light emitted from the high pressure discharge lamp,
wherein the reflecting mirror has an opening at the front thereof in a direction in which light is emitted, and the opening is provided with a front glass,
two air holes are formed through the reflecting mirror,
the two air holes are disposed on a cross section of the reflecting mirror, the cross section including the luminous bulb and being at a substantially right angle is to the direction in which the sealing portions extend, and
if the cross section is divided into first, second, third and fourth quadrants with respect to the luminous bulb, the two air holes are respectively provided in two quadrants diagonal to each other such that the air holes are located in the first and third quadrants, respectively, or in the second and fourth quadrants, respectively.

2. The reflecting-mirror-equipped lamp of claim 1, wherein a virtual line connecting the respective centers of the two air holes touches a portion of the luminous bulb located above the center of the luminous bulb.

3. The reflecting-mirror-equipped lamp of claim 1, wherein none of the two air holes is provided directly over the luminous bulb.

4. The reflecting-mirror-equipped lamp of claim 1, wherein the high pressure discharge lamp is a high pressure mercury lamp including mercury enclosed in an amount of 150 mg/cm$^3$ or more.

5. The reflecting-mirror-equipped lamp of claim 1, wherein the high pressure discharge lamp is a lamp of 80 W or more.

6. An image projecting apparatus comprising:
the reflecting-mirror-equipped lamp recited in claim 1; and
an optical system using the reflecting-mirror-equipped lamp as a light source.

7. The image projecting apparatus of claim 6, wherein no cooling fan for cooling the reflecting-mirror-equipped lamp is provided.

8. A reflecting-mirror-equipped lamp comprising:
a high pressure discharge lamp including a luminous bulb enclosing a luminous material therein and sealing portions respectively extending from both ends of the luminous bulb in a substantially horizontal direction; and
a reflecting mirror for reflecting light emitted from the high pressure discharge lamp,
wherein the reflecting mirror has an opening at the front thereof in a direction in which light is emitted,
two air holes are formed through the reflecting mirror,
the two air holes are disposed at both sides of a line which is substantially vertical to the luminous bulb and passes through the center of the luminous bulb, as viewed from the opening,
one of the air holes is positioned diagonally above the luminous bulb and the other is positioned diagonally below the luminous bulb, and
a virtual line connecting the respective centers of the air holes touches a portion of the luminous bulb located above a horizontal line passing through the center of the luminous bulb.

9. The reflecting-mirror-equipped lamp of claim 8, wherein the high pressure discharge lamp includes a luminous bulb enclosing a luminous material therein and a pair of sealing portions respectively extending from both ends of the luminous bulb,
the reflecting mirror includes a wide opening located at the front thereof in a direction in which light is emitted and a narrow opening into which one of the pair of sealing portions is inserted, and
a translucent member is attached to the wide opening of the reflecting mirror.

10. The reflecting-mirror-equipped lamp of claim 8, wherein none of the two air holes is provided directly over the luminous bulb.

11. The reflecting-mirror-equipped lamp of claim 8, wherein the high pressure discharge lamp is a high pressure mercury lamp including mercury enclosed in an amount of 150 mg/cm$^3$ or more.

12. The reflecting-mirror-equipped lamp of claim 8, wherein the high pressure discharge lamp is a lamp of 80 W or more.

13. An image projecting apparatus comprising:
the reflecting-mirror-equipped lamp recited in claim 8; and
an optical system using the reflecting-mirror-equipped lamp as a light source.

14. The image projecting apparatus of claim 13, wherein no cooling fan for cooling the reflecting-mirror-equipped lamp is provided.

15. A reflecting-mirror-equipped lamp comprising:
a high pressure discharge lamp including a luminous bulb enclosing a luminous material therein and sealing portions respectively extending from both ends of the luminous bulb; and
a reflecting mirror for reflecting light emitted from the high pressure discharge lamp,
wherein the reflecting mirror has an opening at the front thereof in a direction in which light is emitted, and the opening is provided with a front glass,
two air holes are formed through the reflecting mirror,
the two air holes are disposed on a cross section of the reflecting mirror, the cross section including the luminous bulb and being at a substantially right angle is to the direction in which the sealing portions extend,
if the cross section is divided into first, second, third and fourth quadrants with respect to the luminous bulb, the two air holes are respectively provided in two quadrants diagonal to each other such that the air holes are located in the first and third quadrants, respectively, or in the second and fourth quadrants, respectively,
one of the two air holes serves as an inlet of air and the other serves as an outlet of air, during operation of the high pressure discharge lamp, and
the two air holes are positioned such that air enters through the inlet, strikes an upper portion of the luminous bulb, and then goes out through the outlet, in the case where the air is in a state of natural convection.

16. The reflecting-mirror-equipped lamp of claim 15, wherein no air hole which disturbs an airflow coming through the inlet, striking the upper portion of the luminous bulb, and then going out through the outlet is formed.

17. The reflecting-mirror-equipped lamp of claim 15, wherein none of the two air holes is provided directly over the luminous bulb.

18. The reflecting-mirror-equipped lamp of claim 15, wherein the high pressure discharge lamp is a high pressure mercury lamp including mercury enclosed in an amount of 150 mg/cm$^3$ or more.

19. The reflecting-mirror-equipped lamp of claim 15, wherein the high pressure discharge lamp is a lamp of 80 W or more.

20. An image projecting apparatus comprising:
the reflecting-mirror-equipped lamp recited in claim 15; and
an optical system using the reflecting-mirror-equipped lamp as a light source.

21. The image projecting apparatus of claim 20, wherein no cooling fan for cooling the reflecting-mirror-equipped lamp is provided.

* * * * *

UNITED STATES PATENT AND TRADEMARK OFFICE
CERTIFICATE OF CORRECTION

| | | |
|---|---|---|
| PATENT NO. | : 6,981,782 B2 | Page 1 of 1 |
| APPLICATION NO. | : 10/682452 | |
| DATED | : January 3, 2006 | |
| INVENTOR(S) | : Makoto Kai et al. | |

It is certified that error appears in the above-identified patent and that said Letters Patent is hereby corrected as shown below:

Title Page

Item (56), References Cited; FOREIGN PATENT DOCUMENTS, insert the following:

--JP    05089844 A    04/1993--

Signed and Sealed this

Fourteenth Day of November, 2006

JON W. DUDAS
*Director of the United States Patent and Trademark Office*